(12) United States Patent
Suwabe et al.

(10) Patent No.: US 8,894,916 B2
(45) Date of Patent: Nov. 25, 2014

(54) METHOD FOR PRODUCING ALUMINUM-TITANATE-BASED CERAMIC HONEYCOMB STRUCTURE

(75) Inventors: Hirohisa Suwabe, Moka (JP); Masaru Yoshida, Moka (JP); Tomomasa Kumagai, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 444 days.

(21) Appl. No.: 12/516,904

(22) PCT Filed: Dec. 25, 2007

(86) PCT No.: PCT/JP2007/074848
§ 371 (c)(1),
(2), (4) Date: Jun. 10, 2009

(87) PCT Pub. No.: WO2008/078747
PCT Pub. Date: Jul. 3, 2008

(65) Prior Publication Data
US 2010/0044911 A1 Feb. 25, 2010

(30) Foreign Application Priority Data
Dec. 27, 2006 (JP) .................................. 2006-351677

(51) Int. Cl.
C04B 35/478 (2006.01)
(Continued)

(52) U.S. Cl.
CPC ........... C04B 35/478 (2013.01); C04B 38/0006 (2013.01); *C04B 2235/3463* (2013.01);
(Continued)

(58) Field of Classification Search
CPC .............. C04B 35/478; C04B 38/0006; C04B 2235/5472; C04B 2235/5445; C04B 2235/5436; C04B 2235/3217; C04B 2235/3232

USPC ......................................................... 264/630
See application file for complete search history.

(56) References Cited

U.S. PATENT DOCUMENTS 5,422,324 A * 6/1995 Noguchi et al. ............... 501/128
2004/0020846 A1 2/2004 Ogunwumi et al.
(Continued)

FOREIGN PATENT DOCUMENTS

JP 05-085818 4/1993
JP 07-138083 A 5/1995
(Continued)

OTHER PUBLICATIONS

Taruta et al. "Influence of Aluminum Titanate Formation on Sintering of Bimodal Size-Distributed Alumina Powder Mixtures". Journal of the American Ceramic Society, 80 [3] 551-56 (1997).*
Supplementary European Search Report issued in Application No. 07860077.2 dated Apr. 26, 2011.
(Continued)

*Primary Examiner* — Erin Snelting
(74) *Attorney, Agent, or Firm* — Sughrue Mion, PLLC

(57) ABSTRACT

A method for producing an aluminum-titanate-based ceramic honeycomb structure comprising blending $TiO_2$ source powder and $Al_2O_3$ source powder with a $TiO_2/Al_2O_3$ molar ratio of 45/55 to 55/45, and a sintering aid and/or a molding aid to prepare a moldable material, extrusion-molding the moldable material, and drying and sintering the resultant extrudate, the $TiO_2$ source powder having a particle size distribution (mass-based frequency distribution relative to [log(particle size)]), in which both the maximum frequency in a particle size range of 0.2-4 μm and the maximum frequency in a particle size range of 10-100 μm are larger than those in other ranges than the two particle size ranges.

7 Claims, 3 Drawing Sheets

(51) Int. Cl.
*C04B 33/32* (2006.01)
*C04B 38/00* (2006.01)
*C04B 35/636* (2006.01)
*C04B 111/00* (2006.01)

(52) U.S. Cl.
CPC .... *C04B 2235/77* (2013.01); *C04B 2235/9607* (2013.01); *C04B 2235/3222* (2013.01); *C04B 2235/3272* (2013.01); *C04B 2111/00793* (2013.01); *C04B 2235/3232* (2013.01); *C04B 2235/6021* (2013.01); *C04B 2235/79* (2013.01); *C04B 2235/656* (2013.01); *C04B 2111/0081* (2013.01); *C04B 2235/6567* (2013.01); *C04B 2235/401* (2013.01); *C04B 2235/3418* (2013.01); *C04B 2235/6562* (2013.01); *C04B 2235/3213* (2013.01); *C04B 2235/5445* (2013.01); *C04B 2235/5472* (2013.01); *C04B 2235/3206* (2013.01); *C04B 2235/5436* (2013.01); *C04B 2235/3217* (2013.01); *C04B 2235/3472* (2013.01); C04B 35/6365 (2013.01)
USPC .......................................................... 264/630

(56) References Cited

U.S. PATENT DOCUMENTS

2006/0230732 A1* 10/2006 Kunieda ........................ 55/523
2006/0281627 A1* 12/2006 Ellison et al. ................. 501/134

FOREIGN PATENT DOCUMENTS

| JP | 2005-519834 A | 7/2005 |
| JP | 2005-534474 A | 11/2005 |
| JP | 2006-104028 A | 4/2006 |
| JP | 2006-289237 A | 10/2006 |
| JP | 2007-533591 A | 11/2007 |
| WO | 02/070433 A1 | 9/2002 |
| WO | 02/081054 A1 | 10/2002 |
| WO | 03/078352 A1 | 9/2003 |
| WO | 2005/018776 A1 | 3/2005 |
| WO | 2005/026074 A1 | 3/2005 |
| WO | 2006/025498 A1 | 3/2006 |

OTHER PUBLICATIONS

Notification of Reasons for Refusal issued in counterpart Application No. JP 2008-551120 dated Nov. 20, 2012.

* cited by examiner

METHOD FOR PRODUCING ALUMINUM-TITANATE-BASED CERAMIC HONEYCOMB STRUCTURE

CROSS REFERENCE TO RELATED APPLICATION

This application is a National Stage of International Application No. PCT/JP2007/074848 filed Dec. 25, 2007, claiming priority based on Japanese Patent Application No. 2006-351677, filed Dec. 27, 2006, the contents of all of which are incorporated herein by reference in their entirety.

FIELD OF THE INVENTION

The present invention relates to a method for producing an aluminum-titanate-based ceramic honeycomb structure, particularly to a method for producing an aluminum-titanate-based ceramic honeycomb structure suitable for a large ceramic honeycomb filter for cleaning a PM-containing exhaust gas discharged from diesel engines, etc.

BACKGROUND OF THE INVENTION

An exhaust gas emitted from diesel engines contains PM (particulate matter) based on carbonaceous soot and SOF (soluble organic fraction) of high-boiling-point hydrocarbons. When such exhaust gas is released into the atmosphere, it may adversely affect human beings and the environment. For this reason, a PM-capturing ceramic honeycomb filter, which may be called "honeycomb filter" in short, has been disposed in an exhaust pipe connected to a diesel engine. One example of honeycomb filters for purifying an exhaust gas by removing particulate matter is shown in FIGS. 5 (a) and 5 (b). The honeycomb filter 10 comprises a ceramic honeycomb structure (simply called honeycomb structure) comprising porous cell walls 2 defining large numbers of outlet-side-sealed flow paths 3 and inlet-side-sealed flow paths 4, and an outer peripheral wall 1, and upstream-side plugs 6a and downstream-side plugs 6c alternately sealing the outlet-side-sealed flow paths 3 and the inlet-side-sealed flow paths 4 on the exhaust-gas-inlet-side end 8 and the exhaust-gas-outlet-side end 9 in a checkerboard pattern.

Ceramics for forming cell walls of this honeycomb structure are conventionally heat-resistant ceramics such as cordierite, silicon carbide, etc. Among them, cordierite is the optimum ceramic having good heat shock resistance, PM-capturing efficiency and small pressure loss, but it is disadvantageously subjected to local melting in the uncontrolled burning of the captured PM. The local melting undesirably results in the reduction of PM-capturing efficiency. Silicon carbide is resistant to melting erosion because of a higher melting point than that of cordierite, but it has a larger thermal expansion coefficient and poorer heat shock resistance than those of cordierite. Therefore, a honeycomb structure of silicon carbide should be formed by bonding pluralities of small-cross-section-area honeycomb structures, resulting in high production cost.

To solve such problems, attempts have recently been conducted to use aluminum-titanate-based ceramics having excellent heat resistance and low thermal expansion for honeycomb filters.

JP 2005-519834 A discloses a honeycomb filter made of about 50-90% by mass of aluminum titanate stabilized by Fe or Mg and about 10-50% by mass of strontium feldspar, and having a low thermal expansion coefficient, high heat shock resistance, high volume heat capacity, high communicating porosity, a large median pore diameter, and improved thermal stability at 800° C. or higher. It is described that this honeycomb filter can be produced by blending ceramic materials such as silica, alumina, strontium carbonate, titania, iron oxide, magnesium carbonate, etc. with organic components such as a plasticizer, a lubricant, a binder, a solvent, etc., molding the resultant mixture, and if necessary, drying and then sintering the resultant molding. It is also described that in this conventional technology, a titania source for synthesizing aluminum titanate is preferably rutile having a particle size of about 7-15 μm, and an $Al_2O_3$ source is preferably alumina having a particle size of about 10-25 μm.

WO 2005/018776 A discloses a sintered aluminum titanate honeycomb filter formed by sintering a starting material mixture comprising $TiO_2$ (titania) and $Al_2O_3$ (alumina), and 1-10 parts by mass of alkali feldspar, a Mg-containing, spinel-type oxide, MgO or a Mg-containing compound convertible to MgO by sintering. It is described that this honeycomb filter is free from the problems of conventional aluminum titanate, which are thermal decomposition at 800-1280° C. and low mechanical strength, while retaining inherently high heat resistance and small thermal expansion coefficient. It is also described that in this conventional technology, the starting materials are preferably sufficiently mixed and pulverized as finely as possible to an average particle size of 30 μm or less, particularly 8-15 μm.

Both JP 2005-519834 A and WO 2005/018776 A disclose technologies of forming aluminum titanate free from the problems of thermal decomposition at 800-1280° C. and low mechanical strength while retaining inherently high heat resistance and low thermal expansion coefficient, by adjusting the types, compositions and amounts of additives added to $TiO_2$ source powder and $Al_2O_3$ source powder.

However, when the technologies described in JP 2005-519834 A and WO2005/018776 A are used on large honeycomb structures of 100 mm or more in outer diameter and 150 mm or more in length, for instance, they suffer sintering cracking. When silica, strontium carbonate, iron oxide, magnesium carbonate, alkali feldspar, a Mg-containing, spinel-type oxide, MgO, or a Mg-containing compound convertible to MgO by sintering, etc. are added to the $TiO_2$ source powder and the $Al_2O_3$ source powder, these additives form a liquid phase in the sintering process to cause densification, resulting in a large sintering shrinkage ratio. As a result, there is shrinkage difference in the honeycomb structure due to the temperature difference between a center portion and a peripheral portion, so that the honeycomb structure suffers sintering cracking. Such phenomenon is likely to occur more often as the honeycomb structure becomes larger. Sintering cracking occurs often particularly in honeycomb structures of 100 mm or more in outer diameter and 150 mm or more in length. Also, a larger sintering shrinkage ratio provides a smaller average pore size, failing to provide honeycomb filters with necessary porosity.

OBJECT OF THE INVENTION

Accordingly, an object of the present invention is to provide a method for producing an aluminum-titanate-based ceramic honeycomb structure having a large average pore size with less sintering cracking while keeping excellent properties such as low thermal expansion of aluminum titanate.

DISCLOSURE OF THE INVENTION

As a result of intensive research in view of the above object, the inventors have found that in a method for producing a ceramic honeycomb structure made of aluminum titanate by sintering a moldable material comprising $TiO_2$ source powder and $Al_2O_3$ source powder, the use of $TiO_2$ source powder comprising particles having relatively small sizes in a range of 0.2-4 μm and particles having relatively large sizes in a range of 10-100 μm can provide an aluminum-titanate-based ceramic honeycomb structure with less cracking, while keeping excellent properties such as a low thermal expansion coefficient and a large average pore size. The present invention has been completed based on such finding.

Thus, the method of the present invention for producing an aluminum-titanate-based ceramic honeycomb structure comprises blending $TiO_2$ source powder and $Al_2O_3$ source powder with a $TiO_2/Al_2O_3$ molar ratio of 45/55 to 55/45, and a sintering aid and/or a molding aid to prepare a moldable material, extrusion-molding the moldable material, and drying and sintering the resultant extrudate, the $TiO_2$ source powder having a particle size distribution (mass-based frequency distribution relative to [log(particle size)]), in which both the maximum frequency in a particle size range of 0.2-4 μm and the maximum frequency in a particle size range of 10-100 μm are larger than those in other ranges than the two particle size ranges.

In the sintering, the keeping temperature is preferably 1450-1650° C., and the keeping time is preferably 8-30 hours.

The $TiO_2$ source powder preferably has an average particle size of 2-20 μm. The $TiO_2$ source powder preferably contains 50-80% by mass of powder having a particle size of less than 10 μm.

The $Al_2O_3$ source powder preferably has a particle size distribution (mass-based frequency distribution relative to [log(particle size)]), in which both the maximum frequency in a particle size range of 0.2-4 μm and the maximum frequency in a particle size range of 10-100 μm are larger than those in other ranges than the two particle size ranges.

The $Al_2O_3$ source powder preferably has an average particle size of 2-20 μm. The $Al_2O_3$ source powder preferably contains 50-80% by mass of powder having a particle size of less than 10 μm.

BRIEF DESCRIPTION OF THE DRAWINGS

FIG. 5 (*b*) a schematic cross-sectional view showing one example of honeycomb filters in parallel to its flow paths.

DESCRIPTION OF THE PREFERRED EMBODIMENTS

[1] Production Method

Figure 1:
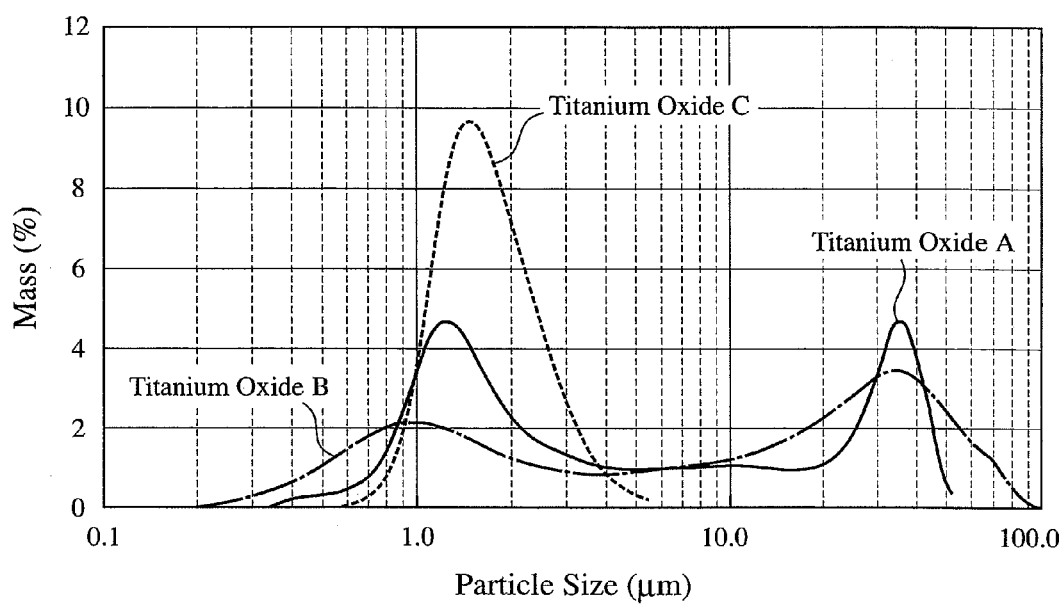
FIG. 1 is a graph showing the particle size distribution of $TiO_2$ source powder used in Examples and Comparative Examples.

The method of the present invention for producing an aluminum-titanate-based ceramic honeycomb structure does not use a moldable material obtained by blending aluminum titanate powder, but blends powdery starting materials forming aluminum titanate by sintering to prepare a moldable material, which is formed to a honeycomb shape and sintered. Accordingly, it does not need a step of forming aluminum titanate powder by sintering and pulverization, resulting in a simplified process as a whole.

Because aluminum titanate is synthesized as sintering progresses in the method of the present invention, it is necessary to increase an aluminum-titanate-synthesizing efficiency. The smaller particle size the starting material powder has, the more rapidly the synthesis of aluminum titanate progresses during sintering, resulting in a higher synthesizing ratio, thus providing a honeycomb structure with a smaller thermal expansion coefficient. However, starting material powder having a smaller particle size provides a larger sintering shrinkage ratio, making it likely that the resultant honeycomb structure suffers sintering cracking. The starting material powder having a smaller particle size also provides a honeycomb structure with smaller porosity and average pore size. To provide a honeycomb structure with small thermal expansion coefficient and sintering shrinkage, as well as porosity and an average pore size preferable to a honeycomb filter, it is necessary to mix starting material powder having a small particle size with starting material powder having a large particle size. Namely, the starting material powder should be bimodal powder having two peaks in its particle size distribution.

However, the above problems cannot be fully solved simply by using bimodal powder. What is needed is that the percentage of starting material powder having a particle size between the two peaks in the particle size distribution is as small as possible. Having such a particle size distribution means that the unsintered honeycomb structure is dense because small-particle-size starting material powder particles fill gaps among large-particle-size starting material powder particles, resulting in an improved aluminum-titanate-synthesizing ratio and a decreased thermal expansion coefficient. At the same time, the starting material powder particles are densely packed, resulting in reduced sintering shrinkage. The existence of starting material powder having a large particle size prevents decrease in porosity and an average pore size.

(1) $TiO_2$ Source Powder

The $TiO_2$ source powder used in the method of the present invention has a particle size distribution, in which both the maximum frequency in a particle size range of 0.2-4 μm and the maximum frequency in a particle size range of 10-100 μm are larger than those in other ranges than the above two particle size ranges. The particle size distribution is a frequency distribution expressed on a mass basis relative to a common logarithm of the particle size [log(particle size)], with the increment of [log(particle size)] (class in a histogram) in a range of 0.03-0.06. Large variation of this increment may change the above maximum, but the increment in a range of 0.03-0.06 provides substantially the same particle size distribution.

Increase in the percentage of the $TiO_2$ source powder having a particle size of less than 0.2 μm results in increased sintering shrinkage and cracking, and decreased porosity and average pore size. As the percentage of the $TiO_2$ source powder having a particle size of more than 4 μm and less than 10 μm increases, the resultant honeycomb structure suffers more sintering shrinkage and cracking, with a larger thermal expansion coefficient. As the percentage of the $TiO_2$ source powder having a particle size of more than 100 μm increases, the resultant honeycomb structure has a larger thermal expansion coefficient.

Figure 2:
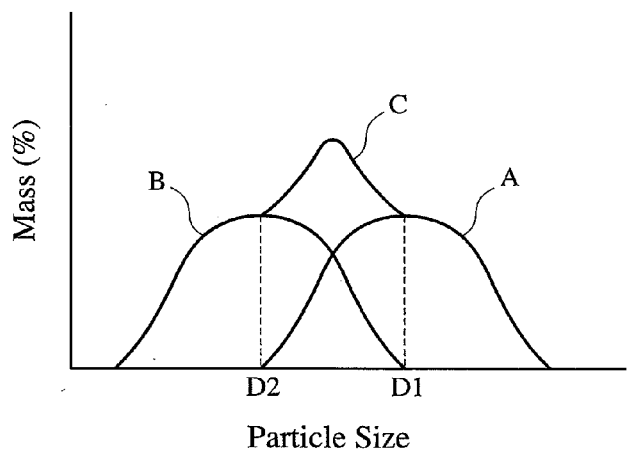
FIG. 2 is a schematic view showing one example of particle size distributions.
Figure 3:
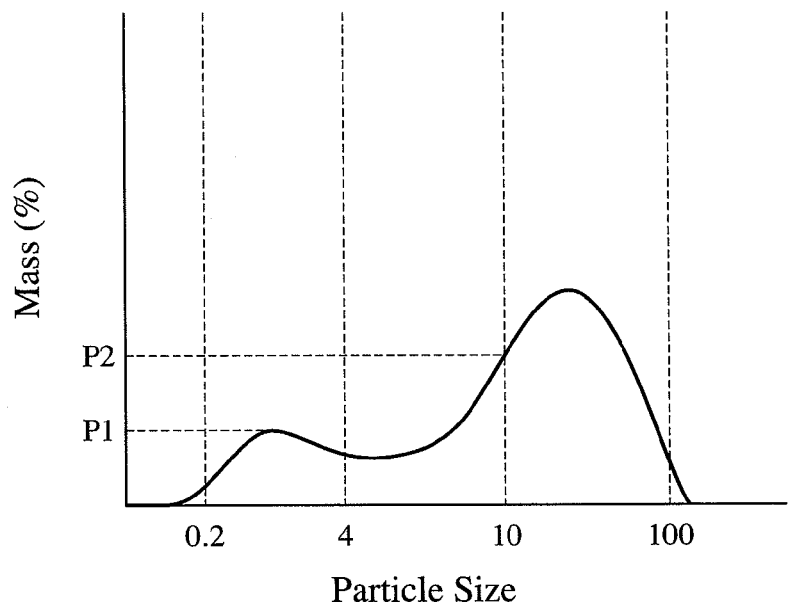
FIG. 3 is a schematic view showing another example of particle size distributions.
Figure 4:
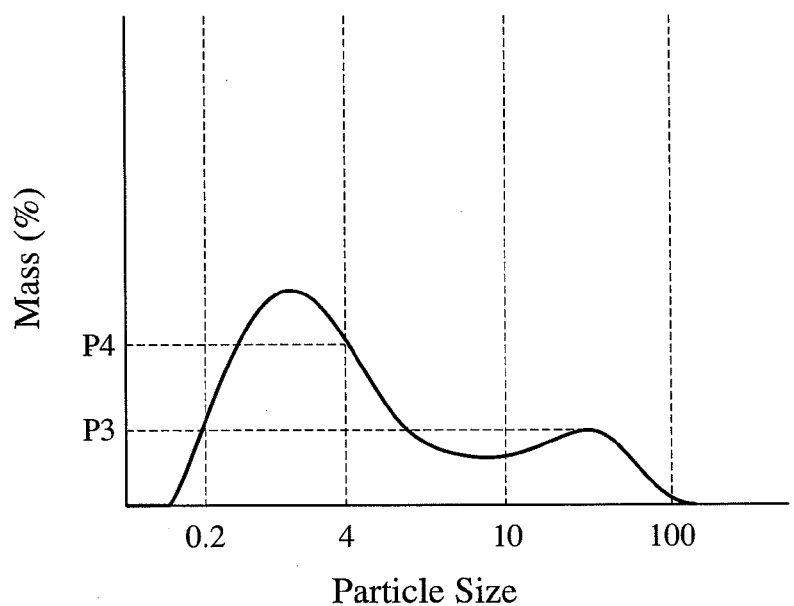
FIG. 4 is a schematic view showing a further example of particle size distributions.
Figure 5A:
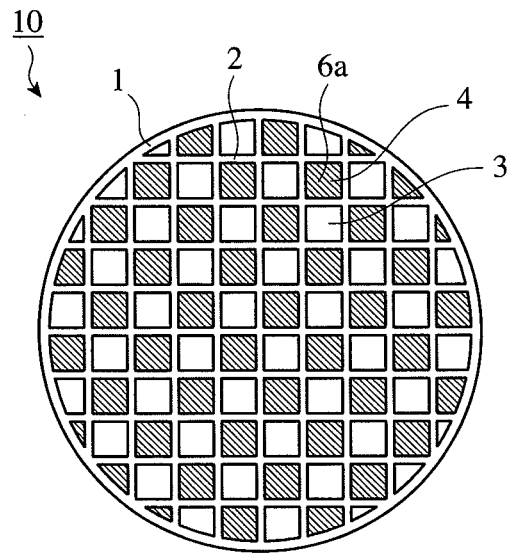
FIG. 5 (*a*) is a schematic cross-sectional view showing one example of honeycomb filters perpendicularly to its flow paths.
Figure 5B:
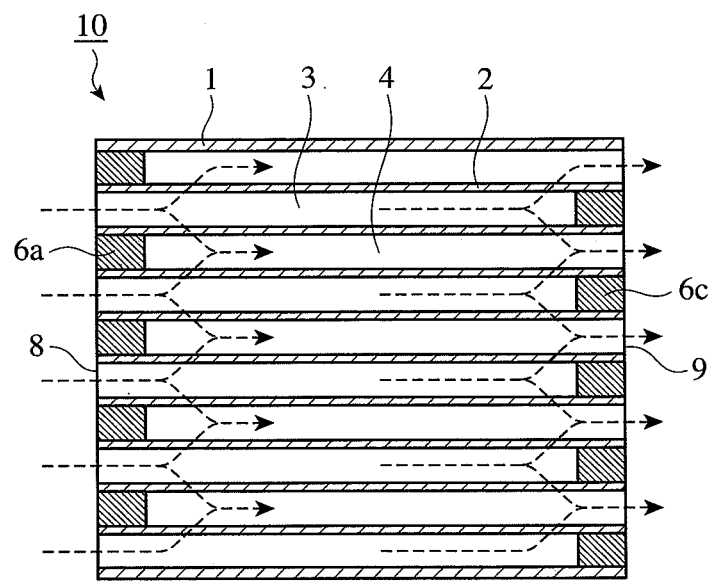

The particle size distribution of the $TiO_2$ source powder described herein cannot be obtained simply by mixing $TiO_2$ source powder having a large average particle size with $TiO_2$ source powder having a small average particle size. As schematically shown in FIG. 2, for instance, when particles having an average particle size D1 and a particle size distribution A are mixed with particles having an average particle size D2 and a particle size distribution B, the resultant particle size distribution has a shape shown by C. When $TiO_2$ source powder having such a particle size distribution is used, the effect of the present invention cannot be obtained. Also, particles having a particle size distribution shown in FIG. 3 fail to exhibit the effect of the present invention because P1<P2, and particles having a particle size distribution shown in FIG. 4 fail to exhibit the effect of the present invention because P3<P4. To obtain starting material powder having the particle size distribution defined in the present invention by mixing starting material powder having a large particle size with starting material powder having a small particle size, starting material powders having narrow particle size distributions should be selected, and classification is needed as the case may be. In addition, the mixing ratio of starting material powders is important. If this ratio were improper, the particle size distribution shown in FIG. 3 or 4 would be obtained.

In the particle size distribution, Dmax/Dmin is preferably 20 or more, more preferably 30 or more, wherein Dmin is a particle size in a range of 0.2-4 μm, which has the maximum frequency, and Dmax is a particle size in a range of 10-100 μm, which has the maximum frequency. When Dmax/Dmin is 20 or more, both the synthesis of aluminum titanate and the reduction of a shrinkage ratio can be well achieved.

In the sintering, the keeping temperature is preferably 1450-1650° C., and the keeping time is preferably 8-30 hours. If the synthesized aluminum titanate powder were used, for instance, even as low a keeping temperature as 1400° C. and as short keeping time as about 4 hours in the sintering would be able to form a honeycomb structure. Also, even when aluminum titanate is synthesized simultaneously with sintering a honeycomb structure, starting material powder having a small particle size would be able to synthesize aluminum titanate at a relatively low keeping temperature in a short keeping time, thereby forming a honeycomb structure having a small thermal expansion coefficient. In the method of the present invention using $TiO_2$ source powder having as large a particle size as 10 μm or more, it is preferable to keep the honeycomb structure at a temperature of 1450° C. or higher for 8 hours or longer, to increase the aluminum-titanate-synthesizing ratio and to provide the honeycomb structure with a low thermal expansion coefficient. Because too high a keeping temperature and too long keeping time provide large sintering shrinkage, the keeping temperature is preferably 1650° C. or lower, and the keeping time is preferably 30 hours or less. Such sintering conditions make the sintering shrinkage smaller, thereby preventing sintering cracking. The sintering temperature is more preferably 1450-1600° C., and the keeping time is more preferably 9-25 hours.

The $TiO_2$ source powder preferably has an average particle size of 2-20 μm. With the average particle size of 2-20 μm, aluminum titanate is synthesized more easily, thereby reducing the sintering shrinkage ratio.

The $TiO_2$ source powder preferably contains 50-80% by mass of powder having a particle size of less than 10 μm. Namely, the amount of powder having a particle size of 10 μm or more is preferably 20-50% by mass. Increase in the percentage of small powder having a particle size of less than 10 μm makes it easier to synthesize aluminum titanate. The percentage of powder having a particle size of less than 10 μm is more preferably 60-80% by mass.

The $TiO_2$ source powder may be either rutile-type titanium oxide or anatase-type titanium oxide, but the rutile-type titanium oxide is preferable.

(2) $Al_2O_3$ Source Powder

To obtain a honeycomb filter having small thermal expansion coefficient and sintering shrinkage and sufficient porosity and average pore size, the $Al_2O_3$ source powder preferably has the same particle size distribution as that of the $TiO_2$ source powder. Accordingly, in the method of the present invention, the $Al_2O_3$ source powder preferably has a particle size distribution (mass-based frequency distribution relative to [log(particle size)]), in which both the maximum frequency in a particle size range of 0.2-4 μm and the maximum frequency in a particle size range of 10-100 μm are larger than those in other ranges than the above two particle size ranges. Among the above two particle size ranges, a larger particle size range is preferably 20-70 μm, and a smaller particle size range is preferably 0.5-4 μm.

The $Al_2O_3$ source powder preferably has an average particle size of 2-20 μm. With the average particle size of 2-20 μm, aluminum titanate is more easily synthesized, resulting in a smaller sintering shrinkage ratio.

The $Al_2O_3$ source powder preferably contains 50-80% by mass of powder having a particle size of less than 10 μm. Namely, the percentage of powder having a particle size of 10 μm or more is preferably 20-50% by mass. Increase in the percentage of small powder having a particle size of less than 10 μm makes it easier to synthesize aluminum titanate. The amount of powder having a particle size of less than 10 μm is more preferably 60-80% by mass.

The $Al_2O_3$ source powder need only be powder capable of forming aluminum oxide when heated to high temperatures, and preferably α-alumina, γ-alumina, aluminum hydroxide, etc.

(3) Other Additives

The sintering aids are preferably silica, strontium carbonate, iron oxide, magnesium carbonate, alkali feldspar, Mg-containing, spinel-type oxides, MgO, Mg-containing compounds converted to MgO by sintering, etc., and contained in an amount of 3-30% by mass.

The molding aids are preferably dispersants, surfactants, binders, lubricants, etc. The binders are preferably methyl cellulose (M) having a viscosity (20° C.) of 5 Pa·s or less as a 2-% aqueous solution, and hydroxypropylmethyl cellulose (H) having a viscosity (20° C.) of 20 Pa·s or more as a 2-% aqueous solution, which are mixed at a mass ratio (M/H) of 50/50 to 90/10, and added in a total amount of 7-12 parts by mass to 100 parts by mass of ceramic powder.

To provide the honeycomb filter with necessary porosity, known pore-forming materials disappearing in the sintering are preferably added. The pore-forming materials may be foamed resins, microballoons, natural graphite or artificial graphite, carbon, wheat flour, starch, charcoal, pulp powder, resins (polyethylene, polystyrene, polypropylene, nylon, polyesters, acrylics, phenol resins, epoxy resins, ethylene-vinyl acetate copolymers, styrene-butadiene block polymers, styrene-isoprene block polymers, polymethyl methacrylate, methyl methacrylate-acrylonitrile copolymers, polyurethanes and wax, etc.), etc.

The present invention will be explained in further detail by Examples below without intention of restricting the present invention thereto.

Examples 1-3 and Comparative Examples 1-3

Titanium oxide powders A-E each having the average particle size, the particle size distribution (the maximum frequency in each particle size range) and the mass ratio of particles having particle sizes of less than 10 μm shown in Table 1, and aluminum oxide powders A and B each having the average particle size, the particle size distribution (the maximum frequency in each particle size range) and the mass ratio of particles having particle sizes of less than 10 μm shown in Table 2 were prepared. The powder was ultrasonically dispersed in a dispersing medium, and its particle size distribution and average particle size were measured by a laser diffraction/scattering method using a particle size distribution meter (Microtrac available from Nikkiso Co., Ltd.). FIG. 1 shows the particle size distributions of the titanium oxide powders A-C. The particle size distributions shown in Tables 1 and 2 indicate the maximum frequency in each particle size range of (a) 0.2 μm or less, (b) 0.2-4 μm, (c) 4-10 μm, (d) 10-100 μm, and (e) 100 μm or more. The frequency is a percentage (%) in each particle size increment of 0.0375 in the axis of abscissas [log(particle size)].

To obtain powders having such particle size distributions as in the titanium oxide powders A and B, a single-dispersion titanium oxide powder having an average particle size of 1 μm was mixed with a single-dispersion titanium oxide powder having an average particle size of 35 μm. About half of the mixed powder was classified to remove powder having a particle size of 4-10 μm, and then mixed with the remaining half. The titanium oxide powder A was obtained by repeating this operation three times, and the titanium oxide powder B was obtained by conducting it once. Aluminum oxide powders A and B were also produced by the same methods as the titanium oxide powders A and B.

Titanium oxide powders A-E, aluminum oxide powders A and B, fused silica powder, an organic foaming agent and methyl cellulose were dry-mixed in the formulations shown in Table 3, and water was added thereto to prepare moldable materials. Using a known honeycomb-structure-forming die, each of these moldable materials was extrusion-molded to form a ceramic honeycomb structure molding. After drying, the moldings were heated at a temperature-elevating speed of 50° C./h between room temperature and 150° C., 10° C./h between 150° C. and 300° C., 50° C./h between 300° C. and 1000° C., and 30° C./h at 1000° C. or higher in the air, and kept at 1550° C. for 10 hours for sintering, to obtain aluminum-titanate-based ceramic honeycomb structures of Examples 1-3 and Comparative Examples 1-3 each having an outer diameter of 143 mm, a length of 152 mm, a cell wall thickness of 0.32 mm and a cell wall pitch of 1.6 mm.

TABLE 1

| Titanium Oxide Powder | Average Particle Size (μm) | Maximum Frequency[1] in Each Particle Size Range | | | | |
|---|---|---|---|---|---|---|
| | | ≤0.2 μm | 0.2-4 μm | 4-10 μm | 10-100 μm | ≥100 μm |
| A | 3.2 | 0.08 | 4.65 | 1.01 | 4.61 | 0 |
| B | 9.8 | 0 | 2.14 | 1.16 | 3.41 | 0 |
| C | 1.5 | 0 | 9.68 | 0.68 | 0 | 0 |
| D | 8.5 | 0.08 | 2.29 | 7.24 | 2.21 | 0 |
| E | 6.7 | 0.08 | 4.39 | 3.64 | 1.23 | 0 |

| Titanium Oxide Powder | Mass Ratio (%) of Particles Having Particle Size of Less Than 10 μm | Crystal Type |
|---|---|---|
| A | 62.5 | Rutile |
| B | 49.7 | Anatase |
| C | 100 | Rutile |
| D | 56.3 | Rutile |
| E | 66.2 | Anatase |

Note:
[1]The maximum frequency (%) in each particle size range in a frequency distribution with a [log (particle size)] increment of 0.0375.

TABLE 2

| Aluminum Oxide Powder | Average Particle Size (μm) | Maximum Frequency[1] in Each Particle Size Range | | | | |
|---|---|---|---|---|---|---|
| | | ≤0.2 μm | 0.2-4 μm | 4-10 μm | 10-100 μm | ≥100 μm |
| A | 1.2 | 0.41 | 8.21 | 1.58 | 0 | 0 |
| B | 8 | 0 | 4.35 | 1.73 | 4.13 | 0 |

| Aluminum Oxide Powder | Mass Ratio (%) of Particles Having Particle Size of Less Than 10 μm |
|---|---|
| A | 99.6 |
| B | 61.9 |

Note:
[1]The maximum frequency (%) in each particle size range in a frequency distribution with a [log (particle size)] increment of 0.0375.

TABLE 3

| Starting Materials (% by mass) | Example 1 | Example 2 | Example 3 |
|---|---|---|---|
| Titanium Oxide Powder A | 44 | — | 44 |
| Titanium Oxide Powder B | — | 44 | — |
| Titanium Oxide Powder C | — | — | — |
| Titanium Oxide Powder D | — | — | — |
| Titanium Oxide Powder E | — | — | — |
| Aluminum Oxide Powder A | 56 | — | — |
| Aluminum Oxide Powder B | — | 56 | 56 |
| Fused Silica | 5 | 5 | 5 |
| Organic Foaming Agent | 10 | 10 | 10 |
| Methyl Cellulose | 7 | 7 | 7 |

| Starting Materials (% by mass) | Comparative Example 1 | Comparative Example 2 | Comparative Example 3 |
|---|---|---|---|
| Titanium Oxide Powder A | — | — | — |
| Titanium Oxide Powder B | — | — | — |
| Titanium Oxide Powder C | 44 | — | — |
| Titanium Oxide Powder D | — | 44 | — |
| Titanium Oxide Powder E | — | — | 44 |
| Aluminum Oxide Powder A | 56 | 56 | 56 |
| Aluminum Oxide Powder B | — | — | — |
| Fused Silica | 5 | 5 | 5 |
| Organic Foaming Agent | 10 | 10 | 10 |
| Methyl Cellulose | 7 | 7 | 7 |

Measurement of Sintering Shrinkage Ratio

The length of the aluminum-titanate-based ceramic honeycomb structure was measured before and after sintering to calculate a sintering shrinkage ratio by the following equation:

Sintering shrinkage ratio (%)=[(length before sintering)−(length after sintering)]/(length before sintering)]×100.

Evaluation of Sintering Cracking

The cross section of the honeycomb structure obtained by cutting along its flow paths was observed with respect to sintering cracking, and evaluated according to the following standard.

Failed: Sintering cracking occurred.
Passed: Sintering cracking did not occur at all.

Aluminum-Titanate-Synthesizing Ratio

Part of the aluminum titanate honeycomb structure was pulverized to powder having a particle size of 0.5 mm or less, and its X-ray diffraction was measured. The aluminum-titanate-synthesizing ratio is expressed by an X-ray diffraction intensity ratio I represented by the following equation:

$$I = I_{AT(230)} / (I_{AT(230)} + I_{TiO2(110)}),$$

wherein $I_{AT(230)}$ is a diffraction intensity of a (023) plane of aluminum titanate, and $I_{TiO2(110)}$ a diffraction intensity of a (110) plane of $TiO_2$ (rutile).

Measurement of Thermal Expansion Coefficient

A test piece having a cross section of 4.8 mm×4.8 mm and a length of 50 mm was cut out of the honeycomb structure with its longitudinal direction in alignment with flow paths. Using a thermomechanical analyzer (TMA, ThermoPlus available from Rigaku Corporation, compression load/differential expansion type), the test piece was heated from room temperature to 800° C. at a temperature-elevating speed of 110° C./min while applying a constant load of 20 g, to measure its longitudinal expansion. The thermal expansion coefficient is expressed by an average thermal expansion coefficient between 35° C. and 800° C.

Measurement of Porosity

The measurement of porosity was conducted by mercury intrusion porosimetry using AutoPore III available from Micromeritics. A test piece of 12.8 mm×12.8 mm×10 mm cut out of the ceramic honeycomb structure was placed in a cell, which was evacuated. After mercury was introduced, the cell was pressurized to determine the relation between a pore diameter and a cumulative pore volume from the relation between pressure and the volume of mercury intruding into pores in the test piece. The mercury-introducing pressure was 0.5 psi (0.35×10$^{-3}$ kg/mm$^2$), and the pore diameter was calculated from the pressure using a contact angle of 130° and a surface tension of 484 dyne/cm.

The evaluation and measurement results are shown in Table 4. The aluminum-titanate-based ceramic honeycomb structures of Examples 1-3 produced by using $TiO_2$ source powder having a particle size distribution, in which both the maximum frequency in a particle size range of 0.2-4 μm and the maximum frequency in a particle size range of 10-100 μm were larger than those in other ranges than the above two particle size ranges, did not suffer sintering cracking, with as small sintering shrinkage ratios as 4-8%. They also had aluminum-titanate-synthesizing ratios of 0.98 or more, as low thermal expansion coefficients as 10–13×10$^{-7}$/° C., as high porosity as 58.7-63.4%, and average pore sizes of 17.8-20.3 μm. Among them, the aluminum-titanate-based ceramic honeycomb structure of Example 3 had a further reduced sintering shrinkage ratio and higher resistance to sintering cracking, presumably because it used $Al_2O_3$ source powder having a particle size distribution, in which both the maximum frequency in a particle size range of 0.2-4 μm and the maximum frequency in a particle size range of 10-100 μm were larger than those in other ranges than the above two particle size ranges. Because 50% or more of the $TiO_2$ source powder and the $Al_2O_3$ source powder used in Examples 1 and 3 were occupied by powder having a particle size of less than 10 μm, their aluminum-titanate-synthesizing ratios were larger than in Example 2.

The aluminum-titanate-based ceramic honeycomb structure of Comparative Example 1 had a large sintering shrinkage ratio and suffered sintering cracking, presumably because the maximum frequency in the $TiO_2$ source powder was 258 in a particle size range of 0.2-4 μm, but 0 in a particle size range of 10-100 μm, less than the maximum frequency of 18 in a particle size range of 4-10 μm.

The aluminum-titanate-based ceramic honeycomb structures of Comparative Examples 2 and 3 also had large sintering shrinkage ratios and suffered sintering cracking, presumably because the maximum frequency in a particle size range of 0.2-4 μm or the maximum frequency in a particle size range of 10-100 μm was less than that in other ranges than the above two particle size ranges.

TABLE 4

| Evaluations | Example 1 | Example 2 | Example 3 |
|---|---|---|---|
| Sintering Cracking | Passed | Passed | Passed |
| Sintering Shrinkage Ratio (%) | 8 | 7 | 4 |
| Aluminum-Titanate-Synthesizing Ratio | 1.0 | 0.98 | 1.0 |
| Thermal Expansion Coefficient (10$^{-7}$/° C.) | 12 | 13 | 10 |
| Porosity (%) | 58.7 | 60.3 | 63.4 |
| Average Pore Size (μm) | 17.8 | 18.6 | 20.3 |

| Evaluations | Comparative Example 1 | Comparative Example 2 | Comparative Example 3 |
|---|---|---|---|
| Sintering Cracking | Failed | Failed | Failed |
| Sintering Shrinkage Ratio (%) | 14 | 12 | 13 |
| Aluminum-Titanate-Synthesizing Ratio | 1.0 | 1.0 | 1.0 |
| Thermal Expansion Coefficient (10$^{-7}$/° C.) | 11 | 12 | 12 |
| Porosity (%) | 52.2 | 54.2 | 53.6 |
| Average Pore Size (μm) | 5.6 | 18.0 | 9.9 |

Examples 4-9

The honeycomb structures of Examples 4-9 were produced in the same manner as in Example 3, except for changing the keeping temperature and time as shown in Table 5, and evaluated as in Examples 1-3. The results are shown in Table 6. Examples 5-8 with the keeping temperatures of 1450-1650° C. and the keeping time of 8-30 hours had smaller sintering shrinkage ratios than that of Example 9, and smaller thermal expansion coefficients than that of Example 4. Particularly Examples 6 and 7 with the keeping temperature of 1450-1600° C. and the keeping time of 9-25 hours had small sintering shrinkage ratios and thermal expansion coefficients.

TABLE 5

| Sintering Conditions | Example 4 | Example 5 | Example 6 | Example 7 | Example 8 | Example 9 |
|---|---|---|---|---|---|---|
| Keeping Temp. (° C.) | 1400 | 1450 | 1600 | 1450 | 1650 | 1670 |
| Keeping Time (hours) | 7 | 30 | 9 | 25 | 8 | 35 |

TABLE 6

| Evaluations | Example 4 | Example 5 | Example 6 |
|---|---|---|---|
| Sintering Cracking | Passed | Passed | Passed |
| Sintering Shrinkage Ratio (%) | 4 | 5 | 4 |
| Aluminum-Titanate-Synthesizing Ratio | 0.98 | 1.0 | 1.0 |
| Thermal Expansion Coefficient (10$^{-7}$/° C.) | 13 | 10 | 10 |
| Porosity (%) | 63.8 | 60.1 | 62.6 |
| Average Pore Size (μm) | 20.6 | 18.5 | 20.1 |

| Evaluations | Example 7 | Example 8 | Example 9 |
|---|---|---|---|
| Sintering Cracking | Passed | Passed | Passed |
| Sintering Shrinkage Ratio (%) | 4 | 5 | 8 |
| Aluminum-Titanate-Synthesizing Ratio | 1.0 | 1.0 | 1.0 |
| Thermal Expansion Coefficient (10$^{-7}$/° C.) | 10 | 10 | 11 |
| Porosity (%) | 61.5 | 58.2 | 57.5 |
| Average Pore Size (μm) | 20.3 | 18.3 | 16.1 |

EFFECT OF THE INVENTION

The method of the present invention produces an aluminum-titanate-based ceramic honeycomb structure with little sintering cracking and a large average pore size while keeping excellent properties such as a low thermal expansion coefficient inherent to aluminum titanate.

What is claimed is:

1. A method for producing an aluminum-titanate-based ceramic honeycomb structure comprising blending $TiO_2$ source powder and $Al_2O_3$ source powder with a $TiO_2/Al_2O_3$ molar ratio of 45/55 to 55/45, and a sintering aid and/or a molding aid to prepare a moldable material, extrusion-molding said moldable material, and drying and sintering the resultant extrudate, said $TiO_2$ source powder having a particle size distribution, wherein the particle size distribution is a mass-based frequency distribution relative to [log(particle size)], in which both a maximum frequency in a particle size range of 0.2-4 μm and a maximum frequency in a particle size range of 10-100 μm are larger than a maximum frequency in a particle size range of more than 4 μm and less than 10 μm, a maximum frequency in a particle size range of less than 0.2 μm and a maximum frequency in a particle size range of more than 100 μm.

2. The method for producing an aluminum-titanate-based ceramic honeycomb structure according to claim 1, wherein a keeping temperature is 1450-1650° C., and a keeping time is 8-30 hours in said sintering.

3. The method for producing an aluminum-titanate-based ceramic honeycomb structure according to claim 2, wherein said $TiO_2$ source powder has an average particle size of 2-20 μm.

4. The method for producing an aluminum-titanate-based ceramic honeycomb structure according to claim 1, wherein said $TiO_2$ source powder contains 50-80% by mass of powder having a particle size of less than 10 μm.

5. The method for producing an aluminum-titanate-based ceramic honeycomb structure according to claim 1, wherein said $Al_2O_3$ source powder has a particle size distribution, wherein the particle size distribution is a mass-based frequency distribution relative to [log(particle size)], in which both the maximum frequency in a particle size range of 0.2-4 μm and the maximum frequency in a particle size range of 10-100 μm are larger than a maximum frequency in a particle size range of more than 4 μm and less than 10 μm, a maximum frequency in a particle size range of less than 0.2 μm and a maximum frequency in a particle size range of more than 100 μm.

6. The method for producing an aluminum-titanate-based ceramic honeycomb structure according to claim 1, wherein said $Al_2O_3$ source powder has an average particle size of 2-20 μm.

7. The method for producing an aluminum-titanate-based ceramic honeycomb structure according to claim 1, wherein said $Al_2O_3$ source powder contains 50-80% by mass of powder having a particle size of less than 10 μm.

* * * * *